(No Model.)

C. F. DUVAL.
CAR WHEEL.

No. 580,342. Patented Apr. 6, 1897.

Witnesses.
P. C. Flintoff
Edward A. Roberts

Inventor
Charles F. Duval

UNITED STATES PATENT OFFICE.

CHARLES F. DUVAL, OF NEW YORK, N. Y.

CAR-WHEEL.

SPECIFICATION forming part of Letters Patent No. 580,342, dated April 6, 1897.

Application filed July 31, 1896. Serial No. 601,171. (No model.)

*To all whom it may concern:*

Be it known that I, CHARLES F. DUVAL, of the city of New York, county and State of New York, have invented certain new and useful Improvements in Car-Wheels, of which the following is a specification.

This invention relates to an improvement in car-wheels, and may be said to consist, broadly, in a wheel in which the tread and the flange are separate, the tread part of the wheel being permanently fastened or keyed to the axle, whereas the flange part is hung loosely upon the axle.

The object of my invention is to produce a wheel which will reduce the excessive friction which is now produced by the wheels acting upon the rails when rounding curves, &c., to a minimum, thus saving wear on wheels, rails, and special work, as well as in a measure an increased safeguard against derailment.

Figure 1:
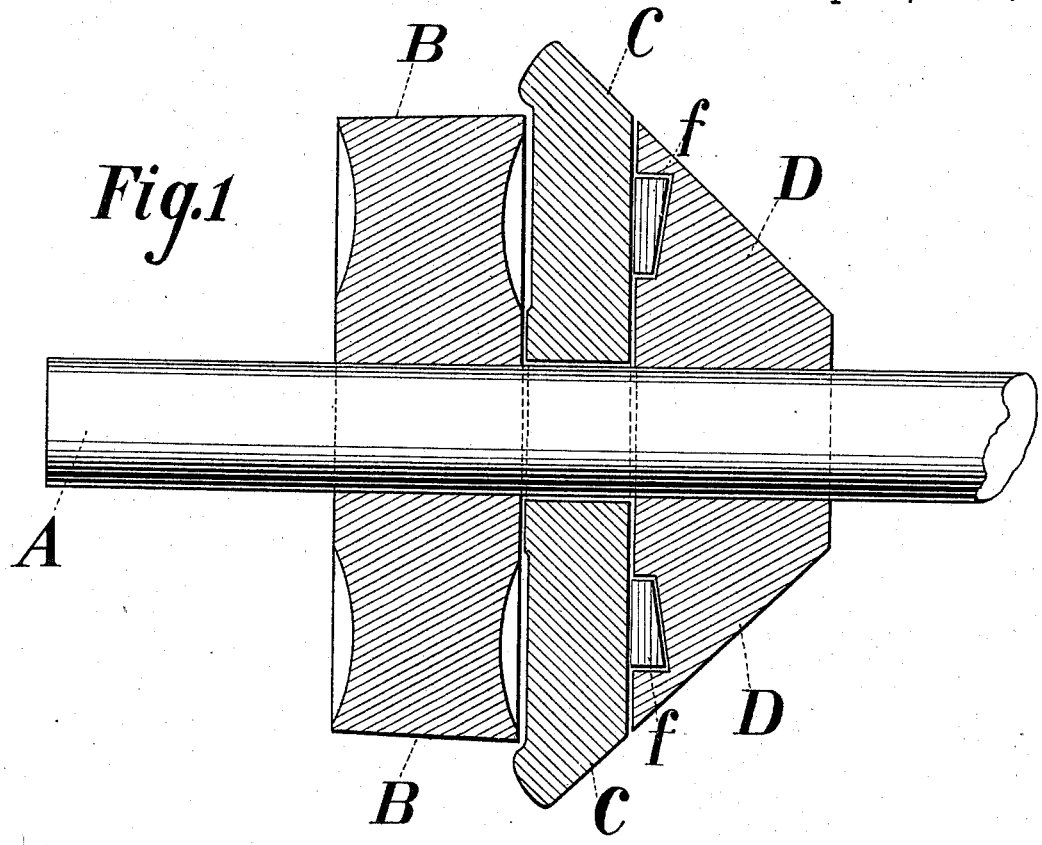
Figure 2:
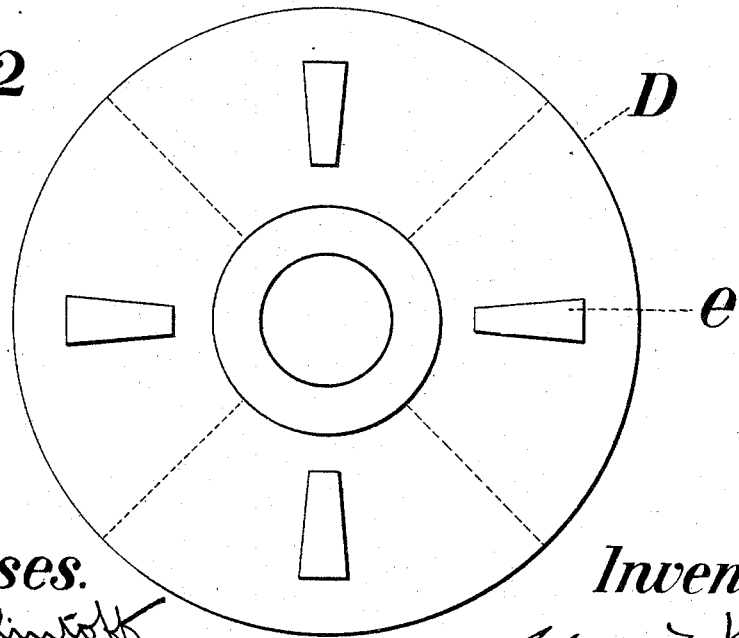

Figure 1 shows a cross-sectional view of a wheel constructed on the lines of my invenvention. Fig. 2 is a face view of the collar or brace-piece for flange, showing recesses for rollers.

My invention consists, as set forth in the accompanying drawings, in a wheel constructed in two parts, the tread part B of the said wheel being permanently fastened or keyed to the axle A in the usual manner, whereas the flange part C of the said wheel is not fastened to the axle A, but is permitted to rotate freely upon the axle A. It may be desirable to strengthen the flange part C of wheel by placing a collar or brace-piece D upon the axle A, as set forth in the drawings, Fig. 1, letter D, a face view of which is shown in Fig. 2. The said collar or brace-piece D may have invested in its face in sockets e, Figs. 1 and 2, rollers, balls, or cones, (cones shown in drawings,) so as to reduce the friction generated by the flange part C of wheel where said flange part of wheel comes in contact with said collar or brace-piece D, as illustrated in Fig. 1.

The invention is illustrated in the accompanying drawings, of which Fig. 1 shows a cross-sectional view of the tread part B, flange part C, and collar or brace-piece D for flange C.

It is understood that the design shown in the drawings may be modified or changed without altering the nature of the invention.

Fig. 2 shows the plain surface or face of collar or brace-piece D and sockets e for cones f, as shown in Fig. 1.

What I claim as new, and desire to secure by Letters Patent, is—

In a car-wheel, the combination of a tread-piece, and a flange-piece, the tread-piece being keyed or fastened in the usual manner upon the axle, the flange-piece being hung loosely so as to permit of its rotating upon the axle, a collar or brace-piece for the said flange, said collar or brace-piece, being provided with recesses in the face adjacent to the flange-piece, and rollers adapted to be carried in said recesses, and to bear against said flange-piece substantially as set forth.

CHARLES F. DUVAL.

Witnesses:
LORENZO A. EVANS,
LEONARD W. SIMMONS.